United States Patent
Satou et al.

(10) Patent No.: US 10,739,364 B2
(45) Date of Patent: Aug. 11, 2020

(54) LIQUID SURFACE INSPECTION DEVICE, AUTOMATED ANALYSIS DEVICE, AND PROCESSING DEVICE

(71) Applicant: HITACHI HIGH-TECHNOLOGIES CORPORATION, Tokyo (JP)

(72) Inventors: Yoshimichi Satou, Tokyo (JP); Yoichiro Suzuki, Tokyo (JP); Yuichi Abe, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 434 days.

(21) Appl. No.: 15/543,026

(22) PCT Filed: Jan. 8, 2016

(86) PCT No.: PCT/JP2016/050418
§ 371 (c)(1),
(2) Date: Jul. 12, 2017

(87) PCT Pub. No.: WO2016/121449
PCT Pub. Date: Aug. 4, 2016

(65) Prior Publication Data
US 2018/0003728 A1   Jan. 4, 2018

(30) Foreign Application Priority Data

Jan. 28, 2015   (JP) ................................ 2015-013873

(51) Int. Cl.
*G01N 35/00*   (2006.01)
*G01N 21/90*   (2006.01)
(Continued)

(52) U.S. Cl.
CPC ... *G01N 35/00663* (2013.01); *G01B 11/0608* (2013.01); *G01N 21/27* (2013.01);
(Continued)

(58) Field of Classification Search
CPC .. G01N 35/10; G01N 35/00663; G01N 35/04; G01N 21/95; G01N 21/27;
(Continued)

(56) References Cited

U.S. PATENT DOCUMENTS

2008/0305012 A1   12/2008   Camenisch

FOREIGN PATENT DOCUMENTS

EP         2 453 233 A1      5/2012
JP         2007-309888 A    11/2007
(Continued)

OTHER PUBLICATIONS

English Language Machine translation of JP2013088114, accessed Oct. 15, 2019, pp. 1-27. (Year: 2019).*

(Continued)

*Primary Examiner* — William H. Beisner
(74) *Attorney, Agent, or Firm* — Mattingly & Malur, PC

(57) ABSTRACT

Provided are a liquid surface inspection device, an automated analysis device, and a liquid surface inspection method with which instances of contamination can be minimized and the accuracy of the manner in which the surface conditions, such as bubbles or the like, of a liquid substance are detected can be enhanced. The device has: a light illumination unit for illuminating a container holding a liquid substance, as well as the surface of the liquid substance, with light; an image capture unit for acquiring a video image having at least color information and brightness information of light from the container and the liquid substance which are illuminated by the light illumination unit; and a detection unit for using the color information and brightness information in the video image captured by the image capture unit to detect the condition of the liquid surface.

7 Claims, 11 Drawing Sheets

(51) Int. Cl.
  *G01N 35/04*  (2006.01)
  *G01N 35/10*  (2006.01)
  *G01B 11/06*  (2006.01)
  *G01N 21/27*  (2006.01)
  *G01N 21/95*  (2006.01)
  *G01N 21/88*  (2006.01)
  *H04N 7/18*  (2006.01)
  *H04N 9/04*  (2006.01)

(52) U.S. Cl.
  CPC ......... *G01N 21/9027* (2013.01); *G01N 21/95* (2013.01); *G01N 35/04* (2013.01); *G01N 35/10* (2013.01); *G01N 2021/8887* (2013.01); *G01N 2035/00673* (2013.01); *G01N 2035/0432* (2013.01); *G01N 2035/1018* (2013.01); *G01N 2201/062* (2013.01); *H04N 7/183* (2013.01); *H04N 9/045* (2013.01)

(58) Field of Classification Search
  CPC ......... G01N 21/9027; G01N 2201/062; G01N 2035/0432; G01N 2021/8887; G01N 2035/00673; G01N 2035/1018; G01B 11/0608; H04N 7/183
  See application file for complete search history.

(56) References Cited

FOREIGN PATENT DOCUMENTS

| | | |
|---|---|---|
| JP | 2013-088114 A | 5/2013 |
| JP | 2014-500955 A | 1/2014 |
| WO | 2012/066034 A1 | 5/2012 |

OTHER PUBLICATIONS

Extended European Search Report received in corresponding European Application No. 16743053.7 dated Sep. 4, 2018.
International Search Report of PCT/JP2016/050418 dated Apr. 5, 2016.

\* cited by examiner

| 0 | 0 | 0 | 0 | 0 |
|---|---|---|---|---|
| 1 | 1 | 0 | -1 | -1 |
| 1 | 1 | 0 | -1 | -1 |
| 1 | 1 | 0 | -1 | -1 |
| 0 | 0 | 0 | 0 | 0 |

$-\pi/16 < \theta \leq \pi/16$
$15\pi/16 < \theta \leq 17\pi/16$ (b)

| 1 | 0 | 0 | 0 | 0 |
|---|---|---|---|---|
| 1 | 1 | 0 | 0 | -1 |
| 1 | 1 | 0 | -1 | -1 |
| 1 | 0 | 0 | -1 | -1 |
| 0 | 0 | 0 | 0 | -1 |

$\pi/16 < \theta \leq 3\pi/16$
$17\pi/16 < \theta \leq 19\pi/16$ (c)

| 1 | 1 | 1 | 0 | 0 |
|---|---|---|---|---|
| 1 | 1 | 0 | 0 | 0 |
| 1 | 0 | 0 | 0 | -1 |
| 0 | 0 | 0 | -1 | -1 |
| 0 | 0 | -1 | -1 | -1 |

$3\pi/16 < \theta \leq 5\pi/16$
$19\pi/16 < \theta \leq 21\pi/16$ (d)

| -1 | -1 | -1 | -1 | 0 |
|----|----|----|----|---|
| 0 | -1 | -1 | 0 | 0 |
| 0 | 0 | 0 | 0 | 0 |
| 0 | 0 | 1 | 1 | 0 |
| 0 | 1 | 1 | 1 | 1 |

$5\pi/16 < \theta \leq 7\pi/16$
$21\pi/16 < \theta \leq 23\pi/16$ (e)

| 0 | 1 | 1 | 1 | 0 |
|---|---|---|---|---|
| 0 | 1 | 1 | 1 | 0 |
| 0 | 0 | 0 | 0 | 0 |
| 0 | -1 | -1 | -1 | 0 |
| 0 | -1 | -1 | -1 | 0 |

$7\pi/16 < \theta \leq 9\pi/16$
$23\pi/16 < \theta \leq 25\pi/16$ (f)

| 0 | -1 | -1 | -1 | -1 |
|---|----|----|----|----|
| 0 | 0 | -1 | -1 | 0 |
| 0 | 0 | 0 | 0 | 0 |
| 0 | 1 | 1 | 0 | 0 |
| 1 | 1 | 1 | 1 | 0 |

$9\pi/16 < \theta \leq 11\pi/16$
$25\pi/16 < \theta \leq 27\pi/16$ (g)

| 0 | 0 | 1 | 1 | 1 |
|---|---|---|---|---|
| 0 | 0 | 0 | 1 | 1 |
| -1 | 0 | 0 | 0 | 1 |
| -1 | -1 | 0 | 0 | 0 |
| -1 | -1 | -1 | 0 | 0 |

$11\pi/16 < \theta \leq 13\pi/16$
$27\pi/16 < \theta \leq 29\pi/16$ (h)

| 0 | 0 | 0 | 0 | -1 |
|---|---|---|---|----|
| 1 | 0 | 0 | -1 | -1 |
| 1 | 1 | 0 | -1 | -1 |
| 1 | 1 | 0 | 0 | -1 |
| 1 | 0 | 0 | 0 | 0 |

$13\pi/16 < \theta \leq 15\pi/16$
$29\pi/16 < \theta \leq 31\pi/16$

FIG. 10

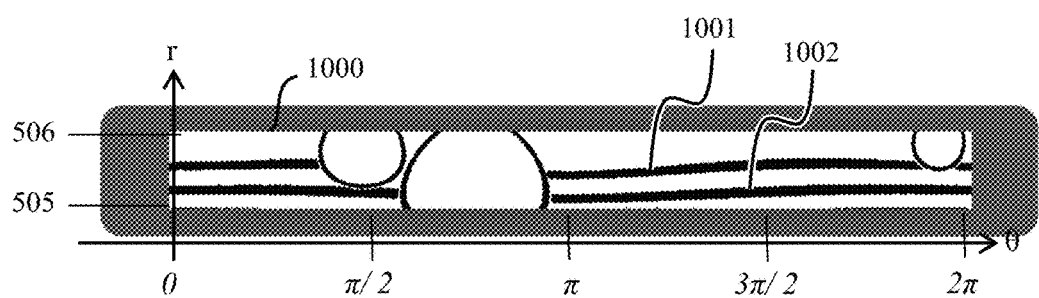

| -1 | -1 | 0 | 1 | 1 |
|----|----|---|---|---|
| -1 | -1 | 0 | 1 | 1 |
| -1 | -1 | 0 | 1 | 1 |

…

LIQUID SURFACE INSPECTION DEVICE, AUTOMATED ANALYSIS DEVICE, AND PROCESSING DEVICE

TECHNICAL FIELD

The present invention relates to a liquid surface condition detector, an automatic analyzer, and a liquid surface condition detecting method for detecting the presence of bubbles or the like on the surface of or/and in a liquid substance from a living body such as blood or urine.

BACKGROUND ART

In the medical field and the like, there have been proposed various kinds of automatic analyzer. Generally speaking, in the automatic analyzer, a sample is analyzed by mixing a biospecimen such as blood or urine with a reagent to obtain a reaction liquid and by performing automatic measurement thereon. The mixture of the biospecimen with the reagent is generally performed by dispensing the sample and reagent from the sample container and reagent container in predetermined amounts through suction dispensing by using a dispensing apparatus (dispense probe) or the like, and by supplying them to a reaction container for reaction.

When performing the dispensing, the distal end of the dispense probe is put into a liquid substance such as the sample and reagent to be dispensed; the deeper it is put in, the more liquid adheres to the outer wall of the probe, resulting in an increase in contamination between the different samples and reagents. Further, the deeper it is put in, the more time is needed for the vertical movement. In view of this, the height of the liquid surface is detected so that the distal end of the dispense probe may be allowed to enter only slightly, with the distal end of the dispense probe being controlled in height direction in conformity with the height. Regarding the technique for detecting this liquid surface height, there is known the problem of erroneously recognizing the height of the surface of any bubble generated on the surface of the liquid as the height of the liquid surface, resulting in failure in suction. To cope with this problem, there has been examined how to detect the liquid surface condition through image processing.

For example, Patent Document 1 discloses a method in which illumination is applied from above to the object of inspection and in which an image of the liquid surface is taken through imaging by a color camera. Then, reflection (mirror surface reflection) of the illumination on the liquid surface is extracted by utilizing hue information indicating a difference in the ratios of the spectral components of light and is counted to thereby detect the presence of bubbles. It can happen that the reflection light from the bottom surface of the sample container creates various complicated and varied images, and that bubbles not interfering with the suction dispensing are generated at the position of the inner wall of the sample container below the liquid surface. In the case, however, by using the method in which the mirror surface reflection of the illumination is extracted, it can be easily distinguished from the condition of bubble generation on the liquid surface.

As another examination example, Patent Document 2 discloses a method in which, after the processing of obtaining the center of a liquid surface circle with respect to the inspection image at the time of imaging by a camera, histogram evaluation and FFT evaluation of a radial image having undergone polar coordinate transformation, and further, ring detection through Hough transformation, are conducted to thereby detect bubbles.

CITATION LIST

Patent Literature

Patent Document 1: JP Patent Publication (Kokai) 2013-088114 A

Patent Document 2: JP Patent Publication (Kohyo) 2014-500955 T

SUMMARY OF INVENTION

Technical Problem

In the case of the examination example disclosed in Patent Document 1, however, when inexpensive visible light illumination is employed, there is the possibility of its being impossible for a sample like a urine sample the liquid color of which is very light or for a sample highly diluted to accurately extract the mirror surface reflection of the illumination on the liquid surface, since their spectral absorption of the visible light area is slight. To cope with this problem, it might be possible to extract the reflection of the illumination to detect the presence of bubbles, by making it possible to obtain a difference in ratio for each spectral component through addition of light of a wavelength out of the visible light range which involves a reduction in permeability even in the case of fresh water which exhibits high permeability with respect to light of a wavelength of the visible light range; in that case, however, an increase in cost for illumination, etc. is to be feared. Further, in the case of a sample containing a large amount of a component causing total reflection of the illumination light out of the sample liquid like grease molecules, the hue of the sample is rather unstable, making it sometimes difficult to extract the reflection of the illumination. The method shown in Patent Document 2 involves an enormous amount of computation, resulting in a problem of an increase in processing time and hardware cost.

In view of the above circumstances, it is an object of the present invention to provide at low cost a liquid surface condition detector, an automatic analyzer, and a liquid surface condition detecting method making it possible to enhance the accuracy with which the liquid surface condition of a liquid substance such as bubbles is detected.

Solution to Problem

In view of the above object, the present invention is endowed with the following features. That is, according to a mode thereof, there are provided an irradiation unit applying light to a container storing a liquid and to the surface of the liquid substance; an imaging unit taking from above an image of the liquid irradiated with light by the irradiation unit; a first liquid surface condition detecting portion detecting the condition of the liquid surface by using color information contained in the image; and a second liquid surface condition detecting portion detecting the condition of the liquid surface by using luminance information contained in the image.

Advantageous Effects of Invention

In the liquid surface condition detector, the automatic analyzer, and the liquid surface condition detecting method according to the present invention, it is possible to enhance the accuracy with which the liquid surface condition such as bubbles is detected with respect to various liquid substances.

BRIEF DESCRIPTION OF DRAWINGS

FIG. 9 is a diagram illustrating a 5×5 weighting matrix according to the embodiment of the present invention.

FIG. 10 is a developed view of the effective zone of the donut circle according to the embodiment of the present invention.

DESCRIPTION OF EMBODIMENTS

In the following, an embodiment of the present invention will be described with reference to the drawings. It should be noted that this embodiment is only given by way of example, and the present invention should not be construed restrictively on the basis thereof.

First Embodiment of the Present Invention

First, a liquid surface condition detector according to an embodiment of the present invention will be described.

Figure 1:
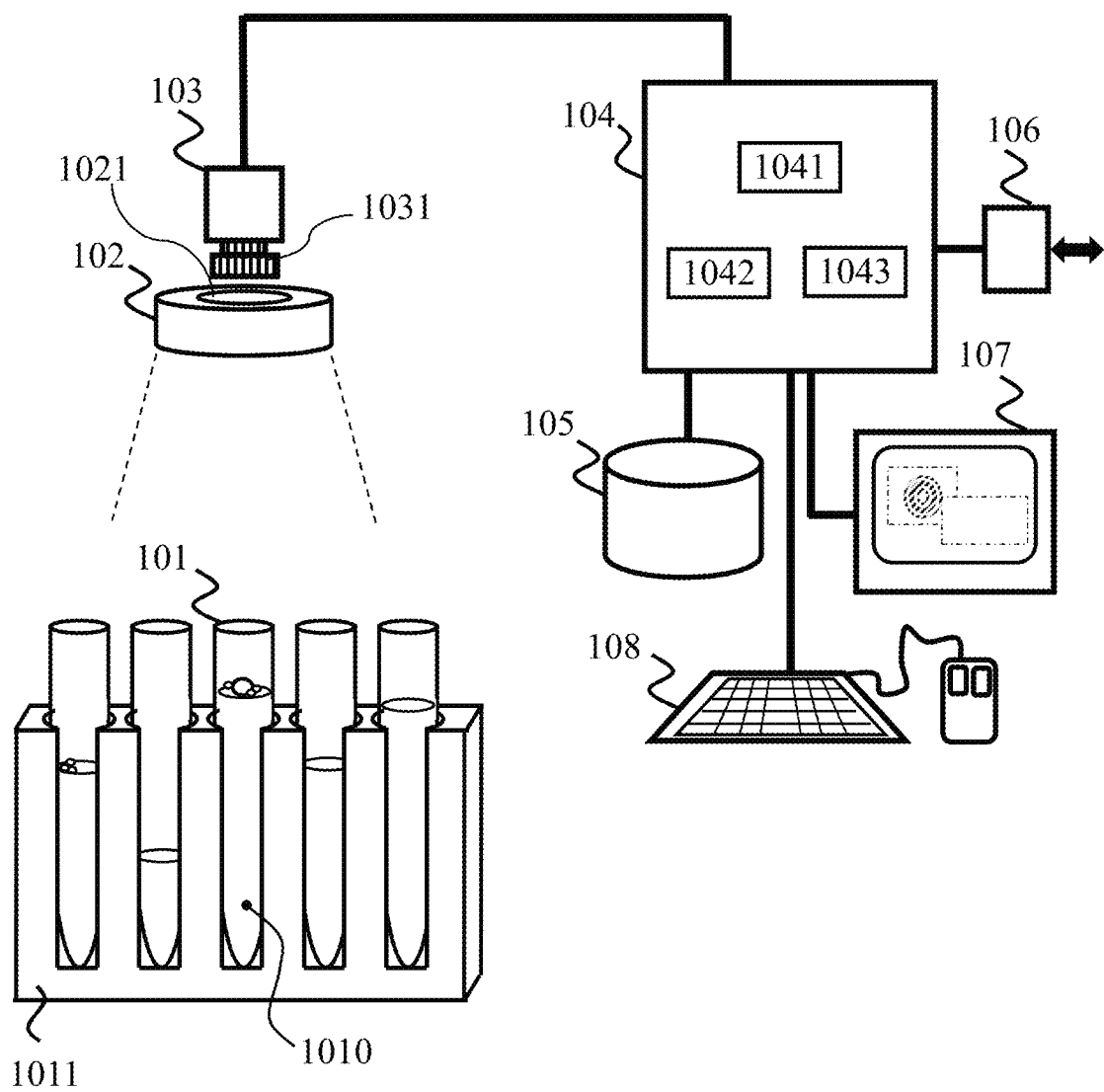
FIG. 1 is a schematic diagram illustrating the construction of a liquid surface condition detector according to an embodiment of the present invention.

FIG. 1 is a schematic diagram illustrating the construction of a liquid surface condition detector according to the first embodiment of the present invention. As shown in FIG. 1, in the liquid surface detector according to the present embodiment, a liquid (hereinafter referred to as a liquid substance 1010) is accommodated in a test tube 101 as a container.

The test tube 101 is formed as a substantially transparent, vertically elongated bottomed cylinder formed of various resin materials, various glass materials, etc., and has a cylindrical or conically tapered container. Examples of the liquid substance 1010 accommodated in the test tube 101 include a biospecimen such as blood or urine, a reagent used for the analysis of the biospecimen, a mixture liquid obtained by mixing the biospecimen with the reagent, and a reaction liquid in which they react with each other. The test tube 101 is held by a test tube rack 1011. Even when the test tube 101 is not in the condition in which it is held by the test tube rack 1011, it is possible to detect the liquid surface condition by the liquid surface condition detector of the present invention, for example, in a condition in which the test tube 101 is alone. Further, while the rack shown in FIG. 1 can hold a plurality of test tubes, the rack may be one which holds only one test tube.

Above the test tube 101, there is provided a lighting 102 as a light irradiation unit for applying light to the liquid surface of the liquid substance 1010 accommodated in the test tube 101. The lighting 102 is what is generally called "ring lighting" and has a hollow 1021. The lighting 102 consists of a plurality of ring-like white LEDs (a combination of blue light emitting diodes with fluorescent materials to attain a quasi-white color which is slightly tinged) arranged close to each other.

Above the lighting 102, there is provided a camera 103 as an imaging unit for taking a picture (hereinafter also referred to as an image) having at least color information of the light from the test tube 101 and the liquid substance 1010 accommodated in the test tube 101 (an exposure amount for each of a plurality of different wavelengths is obtained).

A lens 1031 of the camera 103 is arranged such that it is possible to peep downwards through the hollow 1021 of the lighting 102. The camera 103 generally takes a picture having color information due to light of the three wavelength ranges, R, G, and B; it is formed, for example, through application of a CCD or CMOS image sensor. Electrically connected to the camera 103 is an image processing apparatus 104 as a detection unit for detecting the liquid surface condition by using the color information in the picture taken.

The image processing apparatus 104 consists, for example, of a computer formed by a microprocessor, memory, etc. The image processing apparatus 104 has a mode selection unit 1041 optimally selecting a liquid surface condition mode. Further, the image processing apparatus 104 is provided with a first bubble detection unit 1042 which determines whether or not there is a bubble on the liquid surface from the area of the lighting color mirror-reflected by the liquid surface. Further, the image processing apparatus 104 is provided with a second bubble detection unit 1043 which calculates the brightness gradient in the direction along the inner wall surface configuration of the test tube and which determines whether or not there is a bubble on the liquid surface based on the calculated brightness gradient.

Further, electrically connected to the image processing apparatus 104 is memory 105 as a storage unit for storing the picture with the color information taken by the camera 103 and storing processing results obtained through the processing of the picture. The memory 105 is formed, for example, by a hard disk, flash-memory, etc. Further, connected to the image processing apparatus 104 is an interface unit 106 as an interface portion so that electrical connection to the input/output portions of other devices, apparatuses, etc. may be possible. Further, electrically connected to the image processing apparatus 104 is a display unit 107 as a display portion for displaying a picture with color information taken by the camera 103, processing results obtained through the processing of the picture, etc. The display unit 107 consists, for example, of a liquid crystal monitor. Further, electrically connected to the image processing apparatus 104 is an input unit 108 as an input portion so that information can be input from the exterior to the image processing apparatus 104. The input unit 108 consists, for example, of a keyboard or a mouse.

While in the above description the image processing apparatus 104 as the detection unit, the memory 105, the interface unit 106, the display unit 107, and the input unit 108 are individual devices, it is possible for each of them to be formed as an individual device, or for all or a part of them to be formed as an integral unit. For example, all or a part of the image processing apparatus 104, the memory 105, the interface unit 106, the display unit 107, and the input unit 108 may be integrally formed as a detection unit.

In an embodiment of the present invention, the lighting 102 and the camera 103 are installed vertically above the liquid surface of the container 101, and the light of the lighting undergoes mirror reflection by the liquid surface and can be imaged by the camera. The camera 103 is connected to the image processing apparatus 104, and can perform image processing by transmitting the image information it has taken to the image processing apparatus 104. Further, the image processing apparatus 104 is connected to the memory 105, and can store the image information taken and processing results. The processing process and the information stored in the memory 105 can be displayed on the display unit 107.

Further, the input unit 108 is used for adjustment setting and execution instruction of the image processing apparatus 104.

Next, a liquid surface condition detection process as an example of the liquid surface condition detection process executed by the above liquid surface condition detector described above will be briefly described with reference to FIGS. 2 through 5.

First, the detection mode selection step in which the bubble detection mode is selected is executed by a mode selection unit 1041.

In the detection mode step, first, the lighting light 102 is applied to the test tube 101 and into the interior of the test tube 101, and imaging is performed by the camera 103, whereby there is obtained a picture containing light color information such as the reflection light from the liquid surface of the liquid substance 1010 and the transmitted light (S200). In obtaining of the color information, light is applied from the lighting 102 to the test tube 101 and the liquid surface of the liquid substance 1010 accommodated in the test tube 101, and the camera 103 takes the light color information of the reflection light, transmitted light, etc. from the test tube 101 and from the liquid substance 1010 accommodated in the test tube 101.

Next, there is executed processing in which a zone unnecessary for the selection of the detection mode (peripheral zone) is removed through image processing and in which an effective zone is set (S201). As a result, the image information obtaining range with respect to the liquid surface in the test tube 101 is restricted, making it possible to achieve an improvement in terms of the reliability in the detection mode selection.

Next, the number of pixels exhibiting a color previously determined with respect to the liquid substance 1010 within the set effective zone (hereinafter referred to as the reference color) is counted (S202). Here, the color of the pixels counted is determined depending on the liquid substance 1010 constituting the object of imaging. For example, in the case of blood or urine, it is set to a reference color such as red or yellow. The hue of each pixel within the effective zone is calculated, and when the value thereof is within a predetermined hue range, it is selected as an effective pixel. The reference color is generated through a change in the wavelength spectrum of the lighting light transmitted through the liquid substance based on the characteristics of the light absorption spectrum that the liquid substance has.

Next, the number of pixels exhibiting a color not in the normal state within the effective zone of the liquid substance 1010 (hereinafter referred to as the abnormal color) is counted (S203). To determine whether it is an abnormal color or not, the pixels within the predetermined zone of a predetermined hue (which is, for example, green or yellowish green in the case of blood or urine) are counted as the effective pixels. In the case of a sample containing a large amount of grease component or the like, the hue of the sample is unstable. There appear a large number of pixels of a color that is not that of the specimen in the normal state.

Next, it is determined whether or not the number of pixels exhibiting the reference color counted in step S201 is less than a threshold value (S204). When it is less than the threshold value, the sample is with high transmissivity, so it is determined to be difficult to make a determination by the first detection unit 1042, and the determination by the second detection unit 1043 is selected, with the procedure advancing to step S212. When the number of pixels exhibiting the reference color is not less than the threshold value, the procedure advances to the next step.

Next, it is determined whether or not the number of pixels exhibiting the abnormal color counted in step S203 is equal to or more than a threshold value (S205). When it is the threshold value or more, the hue of the sample is unstable, and the determination by the first detection unit 1042 is regarded as difficult. Then, the determination by the second detection unit 1043 is selected, and the procedure advances to step S212. When the number of pixels exhibiting a color that is not in the normal state is not the threshold value or more, the procedure advances to the step for the first detection unit 1042.

Next, the liquid surface condition detection by the first detection unit 1042 will be described.

First, to remove unnecessary peripheral zone information from the picture taken in step S200, and, to enhance the reliability of the liquid surface condition detection at the position where the distal end of the dispense probe is lowered, there is conducted effective zone setting processing with respect to the liquid surface within the sample container (S206).

Next, the lighting color area reflected by the liquid surface within the effective zone through mirror reflection is extracted (S207). While there are no particular restrictions regarding the method of extracting the lighting color area, a method, for example, may be adopted in which the hue range corresponding to the lighting color is previously determined and in which pixels exhibiting that hue are selected. By using hue for the selection of the lighting color area, distinction can be easily made between the reflection light from a position other than the liquid surface (e.g., a bubble generated at the bottom of the test tube 101 or a position below the liquid surface) and a bubble on the liquid surface constituting the object of detection. Further, due to a difference in the distance from the camera or lighting to the liquid surface, the brightness of the image information on the liquid surface varies. However, by checking the hue indicating a difference in the ratio of the spectral component of light, it is possible to accurately select lighting light mirror-reflected by the liquid surface independently of the distance to the liquid surface.

Next, the number of the lighting color pixels areas extracted is counted (S208). The term lighting color region means a set of pixels extracted in step S207 independently of the number of pixels and the area of the region, and means regions isolated without coming into contact with each other in the picture. More specifically, it can be realized through "labeling (Labeling, Image-labeling)" processing procedures generally known in the image processing technique. By counting the number of regions, it is possible to check the number of reflections of the lighting color without depending on the difference in distance from the camera to the liquid surface and the bubble size.

Next, it is determined whether or not the number of reflection regions of the lighting color counted in step S208 is larger than the number of lightings being used (S209). In the case where there are no bubbles on the liquid surface the lighting is reflected by the liquid surface in the number of lightings, whereas, in the case where there are bubbles on the liquid surface, the lighting light is reflected not only by the liquid surface but also by the surface of each bubble, so that the reflection regions of the lighting light increase. In the present embodiment, there is used a single ring-like light source, so that it is determined that there are bubbles on the liquid surface in the case where the number of regions counted is more than 1 (S210), and it is determined that there are no bubbles in the case where the number of regions 1 or less (S211).

Subsequently, the liquid surface condition detection based on the brightness gradient in the direction along the test tube configuration conducted by the second detection unit 1043 will be described (S212 through S216).

First, there is conducted the processing of setting an effective zone from the image information obtained in step S200 (S212). As a result, information on the unnecessary peripheral region having the possibility of containing noise is removed, and it becomes possible to enhance the reliability of the liquid surface detection at the position where the distal end of the dispense probe descends.

Next, within the effective zone set in step S212, the brightness gradient in the direction along the inner wall surface configuration of the test tube is calculated, and the maximum value of the brightness gradient is obtained (S213).

Next, it is determined whether or not the maximum value of the brightness gradient obtained in step S213 is a predetermined threshold value or more (S214). In the case where the maximum value of the brightness gradient is the threshold value or more, it is determined that there are bubbles on the liquid surface (S215), and, in the case where the maximum value of the brightness gradient is less than the threshold value, it is determined that there are no bubbles (S216).

Figure 3:
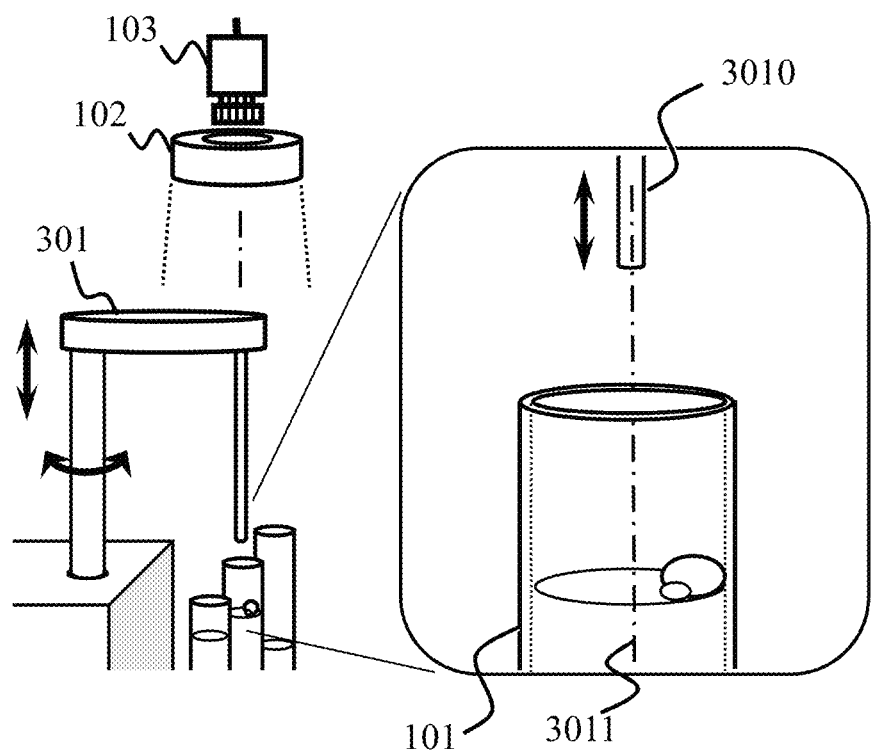
FIG. 3 is a diagram illustrating the positional relationship between a camera, a probe, and a sample container in a liquid surface condition detecting method according to the embodiment of the present invention.

FIG. 3 is an arrangement diagram illustrating the positional relationship between the dispense probe 301, the test tube 101, and the camera 103.

The dispense probe 301 rotates in a horizontal plane, moves in the vertical direction, and dispenses a predetermined amount of liquid from the test tube 101 positioned at the dispensing position. It is desirable for the descent position 3011 where the distal end of the dispense probe 301 comes into contact with the liquid surface to be previously adjusted so as to coincide with the center axis of the test tube 101 for dispensing, or so as to be positioned within a range near the center axis. This is for the purpose of preventing the distal end of the dispense probe 301 from coming into contact with the test tube 101 and of avoiding, as much as possible, the position of a bubble generated on the liquid surface, which is situated so as to be in contact with the inner wall surface of the test tube 101.

Further, it is also desirable for the optical axis of the camera 103 to be previously arranged and adjusted so as to include the descent position 3011 of the distal end of the dispense probe 301. Generally speaking, a camera involves least distortion and exhibits satisfactory resolution near the center of the optical axis.

The sampling position for the dispense probe 301 and the imaging position for the camera 103 are preferably coaxial with each other. However, they may be dislocated with respect to each other. Through the dislocation, it is possible to observe the sampling condition in real time by the camera 103, and it is possible to indicate that no bubble is sucked at the time of dispensing.

Figure 4:
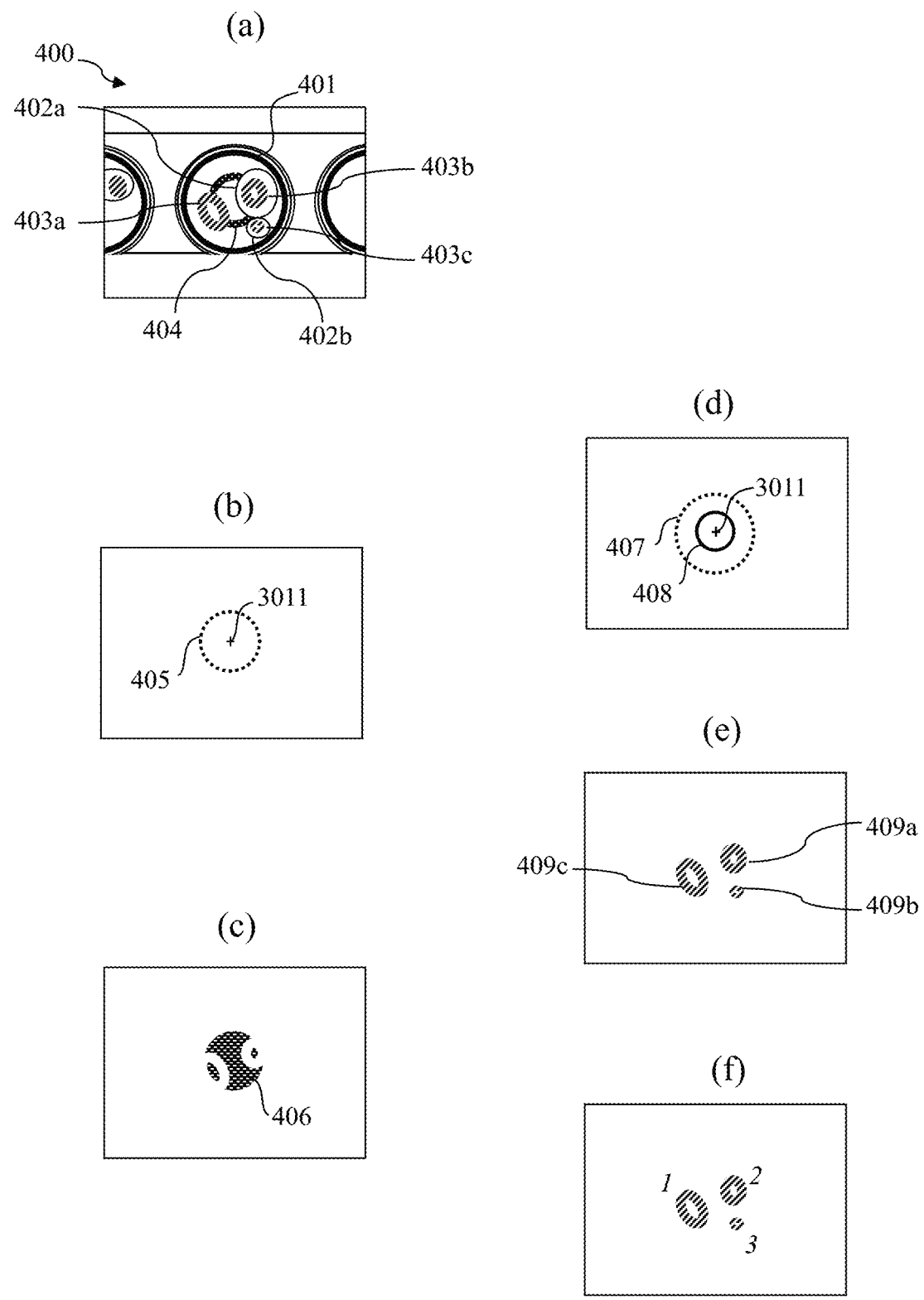
FIG. 4 is a diagram illustrating image information processing according to the embodiment of the present invention.

A bubble determination method using color information detection means will be described with reference to FIG. 4.

Figure 2:
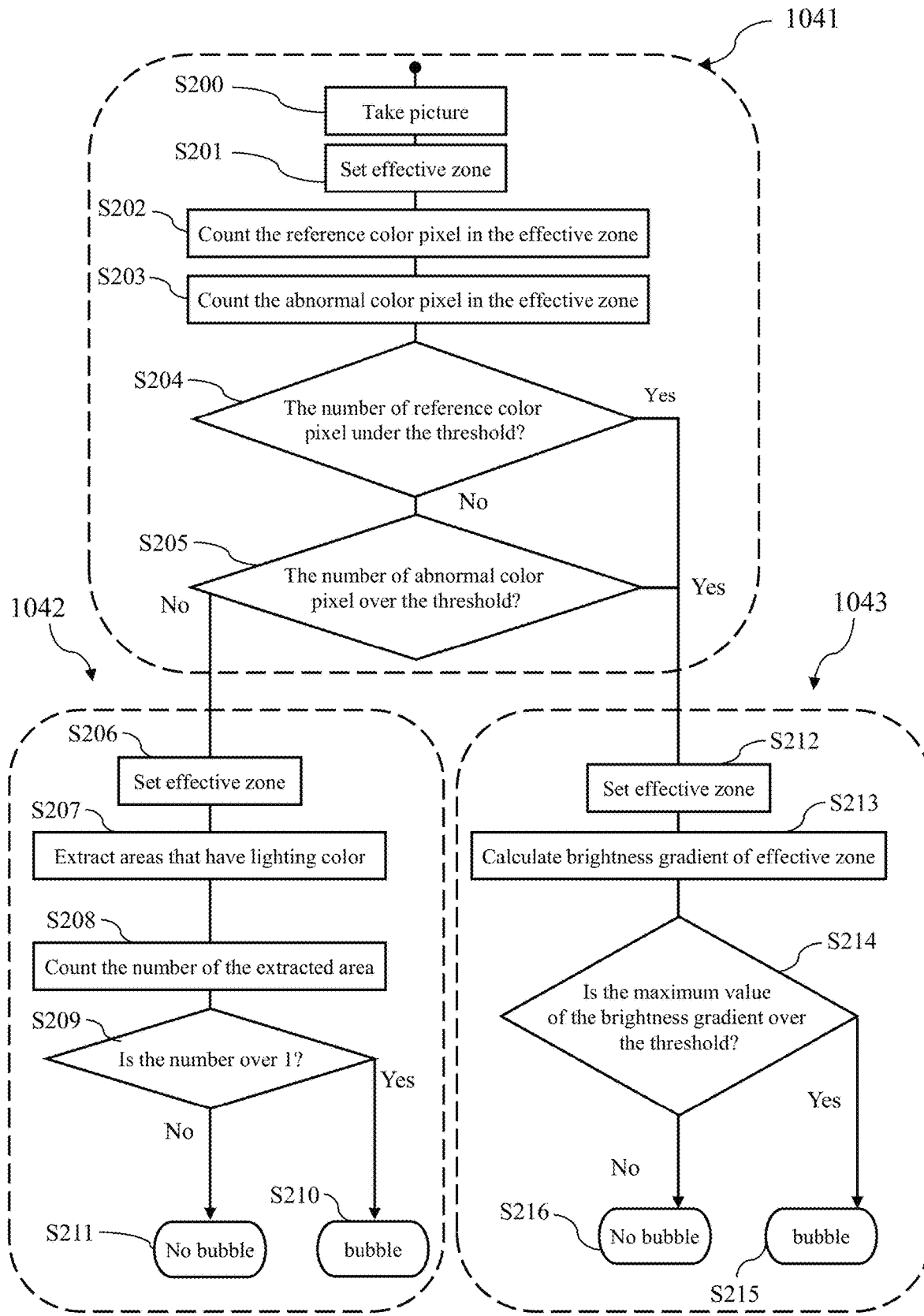
FIG. 2 is a flowchart illustrating a liquid surface condition detecting method according to the embodiment of the present invention.

FIG. 4(a) shows an example of the picture taken in step S200 of the flowchart of FIG. 2. Suppose the actual picture is a color image 400, and the sample is of a normal liquid color. The object of determination is the test tube 401 at the center, and two bubbles 402a and 402b float on the liquid surface at positions where they are in contact with the inner wall surface. It can be seen from the image 400 that, apart from the lighting light reflection region 403a on the liquid surface, there exist on the bubble surface reflection regions 403b and 403c of the lighting light. In the present embodiment, the lighting light source is a hollow ring lighting, so the reflection region of the lighting light is a hollow circle. Further, due to the light and darkness of the reflection light from the tube bottom, it can happen that there is generated a dark portion of the same configuration as the outer configuration of the test tube. In the present embodiment, it is a dark portion 404 of a concentric circular configuration.

FIG. 4(b) is an image showing an effective zone 405 set in step S201 of the flowchart of FIG. 2. It indicates that the zone is set in a circular form around the descent position 3011 for the distal end of the dispense probe 301. Due to the setting of the effective zone 405, even if test tubes are arranged adjacent and close to each other, they do not affect the bubble detection. The information on the portion near the inner wall of the test tube at the center is nullified.

FIG. 4(c) shows an image which is extracted in step S202 of the flowchart of FIG. 2, and which selects pixels within a predetermined range of the region 406 exhibiting the hue of a reference color within an effective zone 405. By extracting the reference color region, solely the region tinged with the color of the liquid accommodated in the test tube 401 is extracted. When the number of pixels in the extracted region is small, it is determined that the bubble determination by the first detection unit 1042 is difficult, and the determination by the second detection unit 1043 is selected. While the image after the extraction of the abnormal color region in step S203 is not shown, switching selection is performed between the first detection unit 1042 and the second detection unit 1043 by the number of pixels of the region exhibiting an abnormal color that is not generated in the normal state.

FIG. 4(d) shows an image which is extracted in step S206 of the flowchart of FIG. 2 and which exhibits an effective zone 407 for the determination by the first detection unit 1042. The zone is set as a circular region around the descent position 3011 of the distal end of the dispense probe 301. The descent position 3011 for the distal end of the dispense probe 301 has been shown as a coordinate point within the image. Actually, however, the distal end portion of the dispense probe has a thickness corresponding to the tube diameter of the probe, and, further, at the descent position, there is the possibility of generation of a mechanical production error or adjustment error. In view of this, there is provided a descent range 408 which is a range allowing descent of the distal end of the dispense probe. In the case where bubbles are detected on the inner side of the descent range 408, the bubbles and the dispense probe are brought into contact with each other to generate erroneous liquid surface detection, and there is the possibility that the liquid cannot be accurately dispensed. However, so long as the bubbles exist outside the descent range, the liquid dispensing is not affected. Thus, the effective zone 407 is set to be larger than the descent range 408, and even in the case where the inner diameter of the test tube is large, there is no need to make a determination with respect to the range not affecting the descent range, so that it is desirable for the zone to be set to be smaller than the entire liquid surface.

FIG. 4(e) shows an image in which a region exhibiting a hue corresponding to the color of the lighting light is extracted in step S207 of the flowchart of FIG. 2. As can be seen from the drawing, such regions as the bubble contour and the inner wall position of the test tube, which are tinged with the color of the liquid, are not extracted, and solely regions 409a through 409c obtained through reflection by the mirror reflection of the lighting light are extracted.

FIG. 4(f) shows an example of a diagram in which the lighting color regions are counted in step S208 of the flowchart of FIG. 2. The present diagram is a schematic one, and there is no need to actually write the counted number to the image. In the present embodiment, it is indicated that, as a result of the counting, three lighting color reflection regions are extracted. In this case, the number of reflection regions of the lighting color extracted in step S209 is more than 1, so that it is determined that there is a bubble on the liquid surface.

Figure 5:
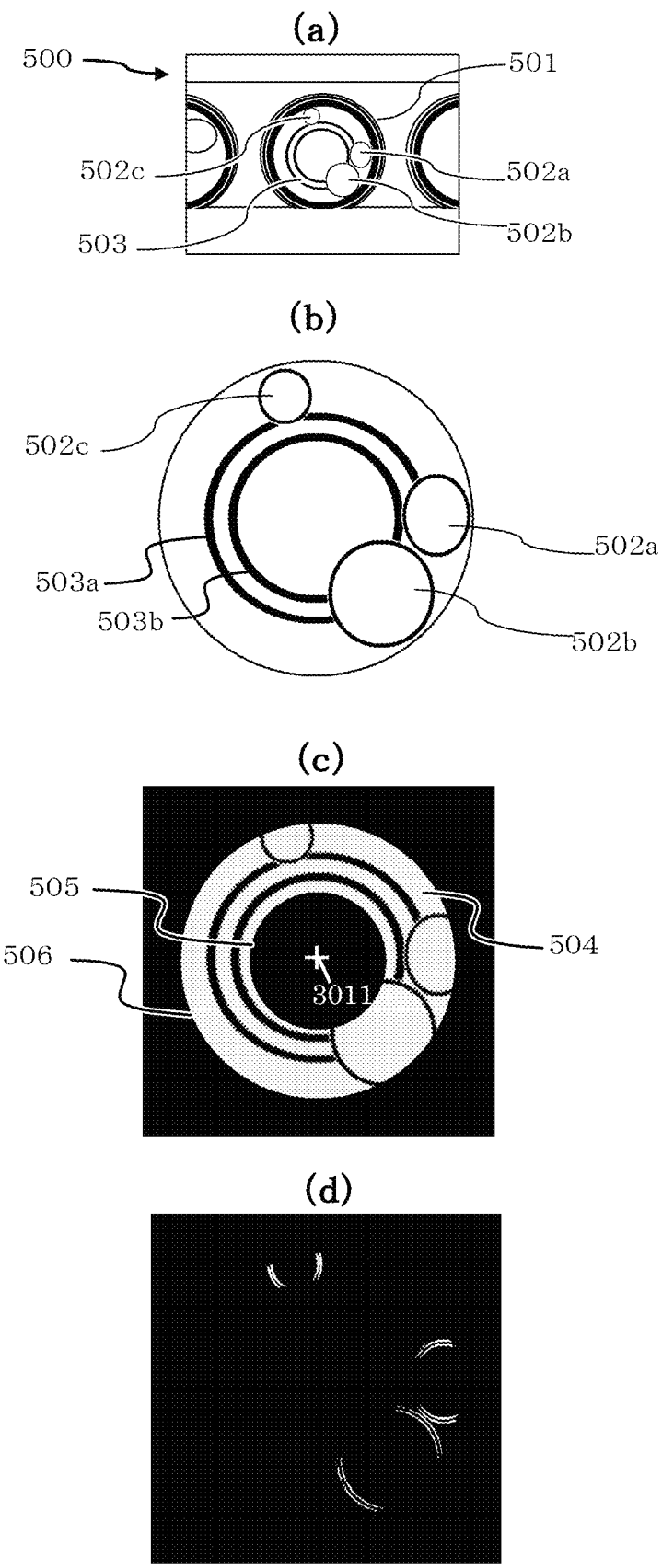
FIG. 5 is a diagram illustrating image information processing according to the embodiment of the present invention.

FIG. 5 illustrates the case of a sample of high light transmissivity over the entire visible light wavelength range, using another example of the image taken in step S200 of the flowchart of FIG. 2.

FIG. 5(a) shows an image 500 which is lighter in liquid color as compared with the image 400 and which is mostly tinged with the lighting color although the image information on the liquid surface exhibits light and darkness. On the liquid surface in the test tube 501 constituting the object of determination, there float three air bubbles 502a, 502b, and 502c while in contact with the inner wall surface of the test tube. Further, due to the light and darkness of the reflection light from the tube bottom, there is a dark portion 503 of a configuration concentric with the contour of the test tube. There ought to be a reflection region of the lighting light source as in the case of the image 400; it is, however, not clear when the transmissivity of the sample is high, and in the following description of the processing, it is slightly related, so that it is omitted in FIG. 5(a).

FIG. 5(b) is an enlarged view of the liquid region inside the central test tube 101 of FIG. 5(a). Dark portions 503a and 503b of a configuration centric with the contour of the test tube are due to the light and darkness of the reflection light from the tube bottom. They vary in size, thickness, and multiplicity due to various factors such as the material and bottom configuration of the test tube and the liquid amount of the sample. In the case of a sample of low transmissivity and deep liquid color, the reflection light from the tube bottom is weak and of low contrast in the image, whereas, in the case of a sample of high transmissivity and of light liquid color, the contrast is high and conspicuous. On the other hand, regarding the outer configuration of the bubbles, the contrast is low and unclear in the case of a sample of low transmissivity and deep liquid color, and, depending upon the liquid amount of the sample, it can disappear due to the reflection light from the tube bottom, whereas, in the case of a sample of high transmissivity and light liquid color, the contrast appears high and clearly.

FIG. 5(c) shows an effective zone 504 in which setting is made so as to remove the region (black region) unnecessary for the latest determination in step S212 of FIG. 2 as compared with the image of FIG. 5(b). The effective zone 504 is set to be a hollow donut-like configuration around the descent position 3011 for the distal end of the dispense probe 301. Due to the hollow donut-like configuration, even if the dark portions 503a and 503b due to the light and darkness of the reflection light from the tube bottom appear in the effective zone, they are not erroneously detected as bubbles. Further, the portion near the descent position 3011 is not set as the effective zone 504, the bubble actually existing on the liquid surface does not remain near the center of the liquid surface of the test tube but approaches the test tube inner wall surface. Thus, no particular problem is involved. In the case where the contour of a bubble is not detected in the periphery of the descent range, it may be determined that there is no bubble within the descent range, so that the inner diameter 505 of the donut circle (i.e., the diameter of the hollow) may be approximately the same as the descent range, and even if the inner diameter of the test tube used is large, the contour 506 of the donut circle may be set to be smaller than the entire liquid surface range.

FIG. 5(d) is a diagram illustrating the calculation results of the brightness gradient obtained through scanning in the direction along the configuration of the test tube of the brightness information (sum total of the brightness of R, G, and B) of the image within the effective zone 504 in step S213 of FIG. 2. The portion of small brightness gradient is shown to be black, and the portion of large brightness gradient is shown to be white. By calculating the brightness gradient in the direction along the circle, it is possible to detect the outer configuration of the bubble without being affected by the concentric dark portions 503a and 503b due to the light and darkness of the reflection light from the tube bottom. When the brightness gradient has been calculated within the effective zone 504, the maximum value of the brightness gradient is obtained. When the obtained maximum value is a predetermined threshold value or more, it is determined that a bubble has been generated, and when the obtained maximum value is less than the threshold value, it is determined that no bubble has been generated.

In the determination of the liquid surface condition in an ordinary test tube, the distance from the camera and the lighting to the liquid specimen undergoes a change, and the brightness information on the liquid surface also undergoes a change, so that the determination based on the threshold value is difficult. However, by using the brightness gradient of the above method, it is possible to robustly determine the presence of bubbles without depending on the liquid surface height.

Next, a method of calculating the brightness gradient in the direction along the test tube configuration in step S213 of FIG. 2 will be described with reference to FIGS. 6 and 7.

Figure 6:
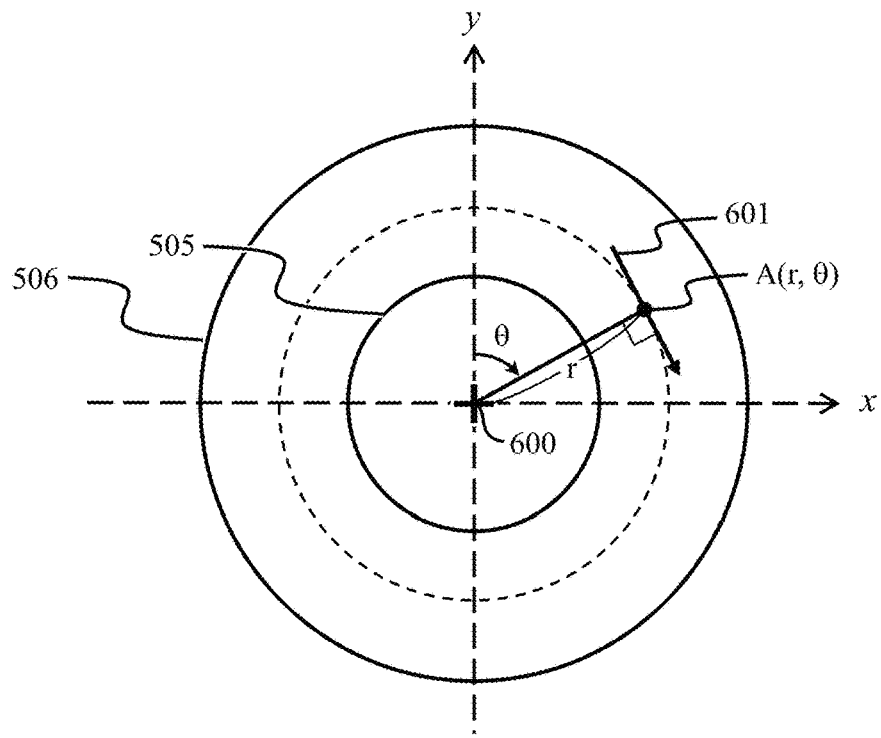
FIG. 6 is a diagram illustrating an effective zone and a circular coordinate of a donut circle according to the embodiment of the present invention.

FIG. 6 is a diagram illustrating the effective zone 504 shown in FIG. 5(c) in an xy orthogonal coordinate plane. As shown in the drawing, the coordinate in the effective zone 504 can be expressed in a circular coordinate (r, θ) the origin of which is the descent position 600. In FIG. 6, the direction along the inner wall configuration of the test tube configuration is the tangential direction of a circle with a radius r. In the circular coordinate A (r, θ), it is the direction of the tangent 601 in the drawing.

Figure 7:
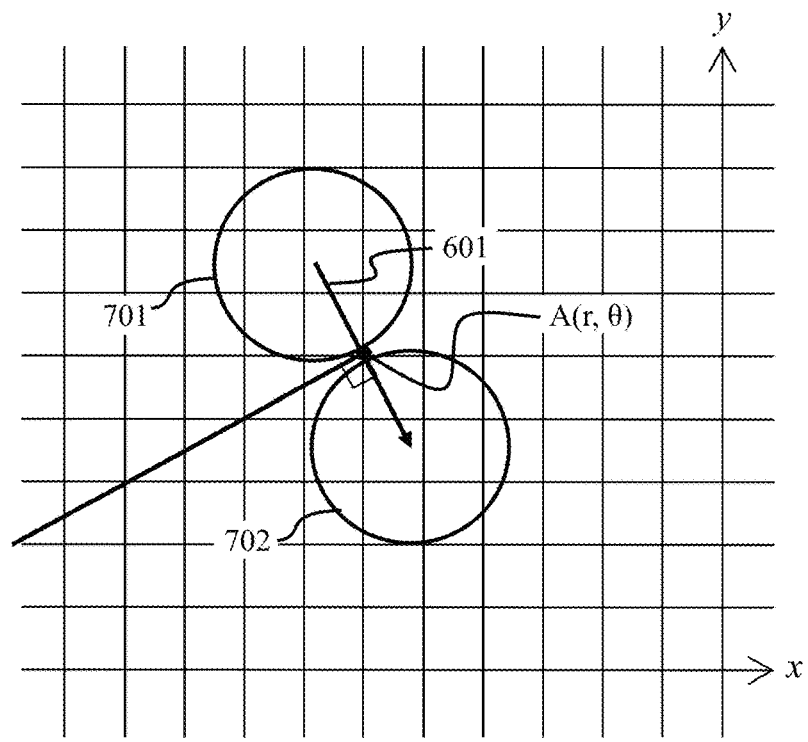
FIG. 7 is a diagram illustrating a zone in the vicinity of the circular coordinate according to the embodiment of the present invention.

FIG. 7 is an enlarged view of the portion near the circular coordinate A (r, θ). To calculate the brightness gradient in the coordinate A (r, θ), the pixel brightness average is obtained for each of two vicinity ranges 701 and 702 adjacent to each other in the direction of the tangent 601 with the coordinate A (r, θ) therebetween, and the absolute value of the difference between the two brightness averages is obtained as the brightness gradient. More strictly, the calculation method for the direction dependent type filter described in the treatise "Image quality improvement for an MRI image using a direction dependent type filter" (Kido, et al.) in a Transactions of the Institute of Electronics, Information and Communication Engineers D-2, No. 8, vol. 79 (issued in 1996) is restrictively applied to the tangential direction of a circle to obtain the absolute value.

The present invention is not restricted to the embodiment described above but allows various modifications without departing from the scope of the gist of the present invention.

According to the present embodiment, it is possible to accurately determine the presence of bubbles on the liquid surface of a liquid substance without depending upon the light and shade of the liquid color of the sample constituting the object of determination. Further, an ordinary visible light lighting is used, and it is only necessary to perform minimal calculation processing with respect to image information on a limited range, so that the embodiment can be realized at low cost.

In the present embodiment, the effective zone is set to a circular or donut-shaped configuration of a fixed radius. In the case, however, where the test tube configuration is not columnar but of a special configuration and where the descent range (702) for the distal end of the probe is elliptical or rectangular due to a mechanical error factor, the configuration and size of the effective zone may be changed accordingly to achieve an improvement in terms of the accuracy in the detection. Further, while the optimum configuration and size for each object are to be regarded as individual, the effective zones 405, 407, and 504 may be set commonly in order to reduce the number of setting steps.

Further, steps S202 and S203 for counting the pixels exhibiting the reference color and the abnormal color may be executed simultaneously, or the detection mode selection processing may be terminated at the point in time when one count value has attained a level allowing determination.

In steps S204 and S205 in which determination is made through comparison between the counted pixel number and the threshold value, the determination may be made through comparison of the ratio (area ratio) of the reference color or abnormal color pixel number with respect to the total pixel number in the set effective zone 405 with the threshold value. In this case, a change in the enlargement ratio of the picture taken by the camera can be robustly coped with.

Further, the algorithms for the first liquid surface condition detection unit 1042 and the second liquid surface condition detection unit 1043 may be executed simultaneously. In this case, there is no need to execute steps S204 and S205 for the selection of steps for the first liquid surface condition detection unit 1042 and the second liquid surface condition detection unit 1043, and the final result of the detection of a bubble is derived from at least one of the respective determination results of these liquid surface condition detection units.

Further, in order that the number of kinds of liquid substance 1010 to which the present invention is applicable may be increased, it may be so arranged that a plurality of reference color hue ranges can be set for the liquid substance 1010. Similarly, it may be so arranged that a plurality of abnormal color hue ranges can be set. The determination of the reference color, abnormal color, and lighting color of the liquid substance 1010 may be based on a color system other than hue. Hue is convenient in that it allows color designation one-dimensionally and that it helps to easily establish correspondence with human color sense.

However, some other kind of information will also do so long as it is color information not depending on the distance to the liquid surface constituting the object of shooting. For example, the color range may be designated by color difference information U and V in a YUV format, or, in the case of an RGB format, the designation may be executed by using the ratio of R/G, B/G, etc.

Further, as the original brightness information in step S213 for obtaining the brightness gradient, some other kind of brightness information may be used instead of the sum total of the brightness of R, G, and B. It may, for example, be brightness information on one of R, G, and B channels, or average brightness, or monochrome transformation image information in conformity with human vision.

Further, in step S213, it is not always necessary to obtain the "maximum value" of the brightness gradient. Alternatively, it may be determined that a bubble has been generated if there is at least one portion of a brightness gradient equal to or greater than a predetermined threshold value within the effective zone. In adjusting and setting the threshold value, it is desirable to check the brightness gradient of the entire effective zone and to make it possible to obtain the maximum value. However, after the threshold value has been determined, there is no need to obtain the maximum value. It may be determined that a bubble has been generated if there is at least one portion of a brightness gradient equal to or greater than the predetermined threshold value, and, by completing the determination at the point in time when the brightness gradient equal to or greater than the threshold value while brightness information on the effective zone is being gained, it is possible to quickly terminate the determination processing.

Second Embodiment

As a second embodiment, another brightness gradient calculation method will be described with reference to FIGS. 8 and 9.

Figure 8:
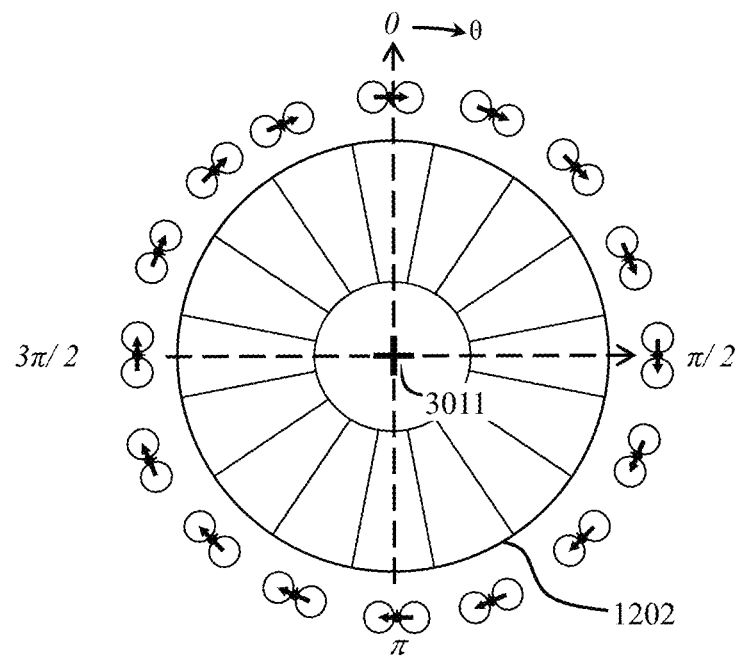
FIG. 8 is a diagram illustrating the 16-part division of the effective zone according to the embodiment of the present invention.

FIG. 8 is a diagram illustrating how the region of the effective zone 504 is divided into equal angles. In the embodiment, there is shown a case where the effective zone is divided into 16 equal parts so that θ=π/8 radians. For each region, the brightness gradient is approximately calculated in the tangential direction of the circle by using the weighting matrix shown in FIGS. 9(a) through 9(h). By using the brightness of 5×5 proximity pixels around the pixel (r, θ), the brightness gradient is calculated. The product of the values of the arrangement elements of a weighting matrix corresponding to the brightness of each of the 5×5 proximity pixels is obtained and 25 products in total are added, and the absolute value thereof is regarded as the brightness gradient. Each weighting matrix is weighted in the tangential direction of the circle in correspondence with θ.

The weighting matrix of FIG. 9(a) is used in the region of −π/16<θ≤π/16 or in the region of 15π/16<θ<17π/16. The weighting matrix of FIG. 9(b) is used in the region of π/16<θ<3π/16 or in the region of 17π/16<θ≤19π/16. The weighting matrix of FIG. 9(c) is used in the region of 3π/16<θ≤5π/16 or in the region of 19π/16<θ<21π/16. The weighting matrix of FIG. 9(d) is used in the region of 5π/16<θ≤7π/16 or in the region of 21π/16<θ≤23π/16. The weighting matrix of FIG. 9(e) is used in the region of 7π/16<θ≤9π/16 or in the region of 23π/16<θ≤25π/16. The weighting matrix of FIG. 9(f) is used in the region of 9π/16<θ≤11π/16 or in the region of 25π/16<θ≤27π/16. The weighting matrix of FIG. 9(g) is used in the region of 11π/16<θ≤13π/16 or in the region of 27π/16<θ≤29π/16. The weighting matrix of FIG. 9(h) is used in the region of 13π/16<θ≤15π/16 or in the region of 29π/16<θ≤31π/16.

The weighting matrix of FIG. 9 is only given by way of example. A weighting matrix of different range such as 7×7 or 3×3 may be used, or the effective zone may be divided more finely into 32 parts, and 16 kinds of corresponding weighting matrix may be used to achieve an improvement in terms of calculation accuracy. Further, fine adjustment may be made on the values of the arrangement elements of each weighting matrix to achieve an improvement in terms of calculation accuracy.

Next, a method of calculating the brightness gradient in the tangential direction of a circle using coordinate system transformation will be described with reference to FIGS. 10 through 12.

Reference numeral 1000 of FIG. 10 indicates what is obtained through transformation and development of the image information of the effective zone 504 (the region from the inner diameter 505 to the outer diameter 506, where 0≤θ≤2π radians) into the plane having a horizontal axis θ and vertical axis r. A dark portion of a concentric circular configuration due to the light and darkness of the reflection light from the tube bottom is developed as indicated by numerals 1001 and 1002.

In the image information after this development, the tangential direction of the original circle is replaced by the direction of the θ-axis, and the brightness gradient can be calculated by one weighting matrix. FIG. 12 shows what is obtained by calculating the brightness gradient in the θ-direction based on the 5×3 weighting matrix shown in FIG. 11 and depicting the brightness gradient of the pixel positions in the form of a picture. The portion where the brightness gradient is small is shown to be black, and the portion where the brightness gradient is large is shown to be white. By calculating the brightness gradient in restriction to the θ-direction along the circle, it is possible to capture the outer configuration of the bubble without being affected by the dark portions 1001 and 1002 of a concentric configuration due to the light and darkness of the reflection light from the tube bottom. In the picture shown in FIG. 10, the dark portions 1001 and 1002 are drawn not in a straight line but in a gentle curve. This phenomenon occurs when the descent position 3011 is deviated from the center of the test tube contour, or when the tube bottom configuration of the test tube is distorted. However, when the brightness gradient is calculated based on the brightness information on a range in the vicinity to some degree, it is possible to capture the brightness gradient due to the outer configuration of the air bubble without a hitch.

Figures 11, 12:
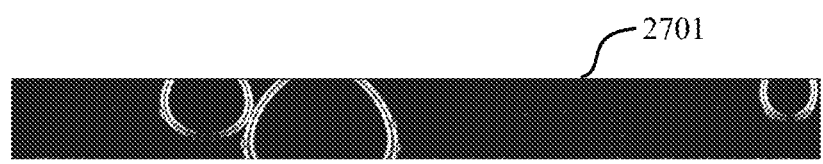
FIG. 11 is a diagram illustrating a 5×3 weighting matrix according to the embodiment of the present invention.
FIG. 12 is a diagram illustrating the brightness gradient calculated by the 5×3 weighting matrix.

The 5×3 weighting matrix shown in FIG. 11 is only given by way of example, and a weighting matrix of a different range such as 7×5 or 3×3 may be used. Further, fine adjustment may be made on the value of each arrangement element of the weighting matrix to thereby achieve an improvement in terms of detection accuracy.

Third Embodiment of the Present Invention

Figure 13:
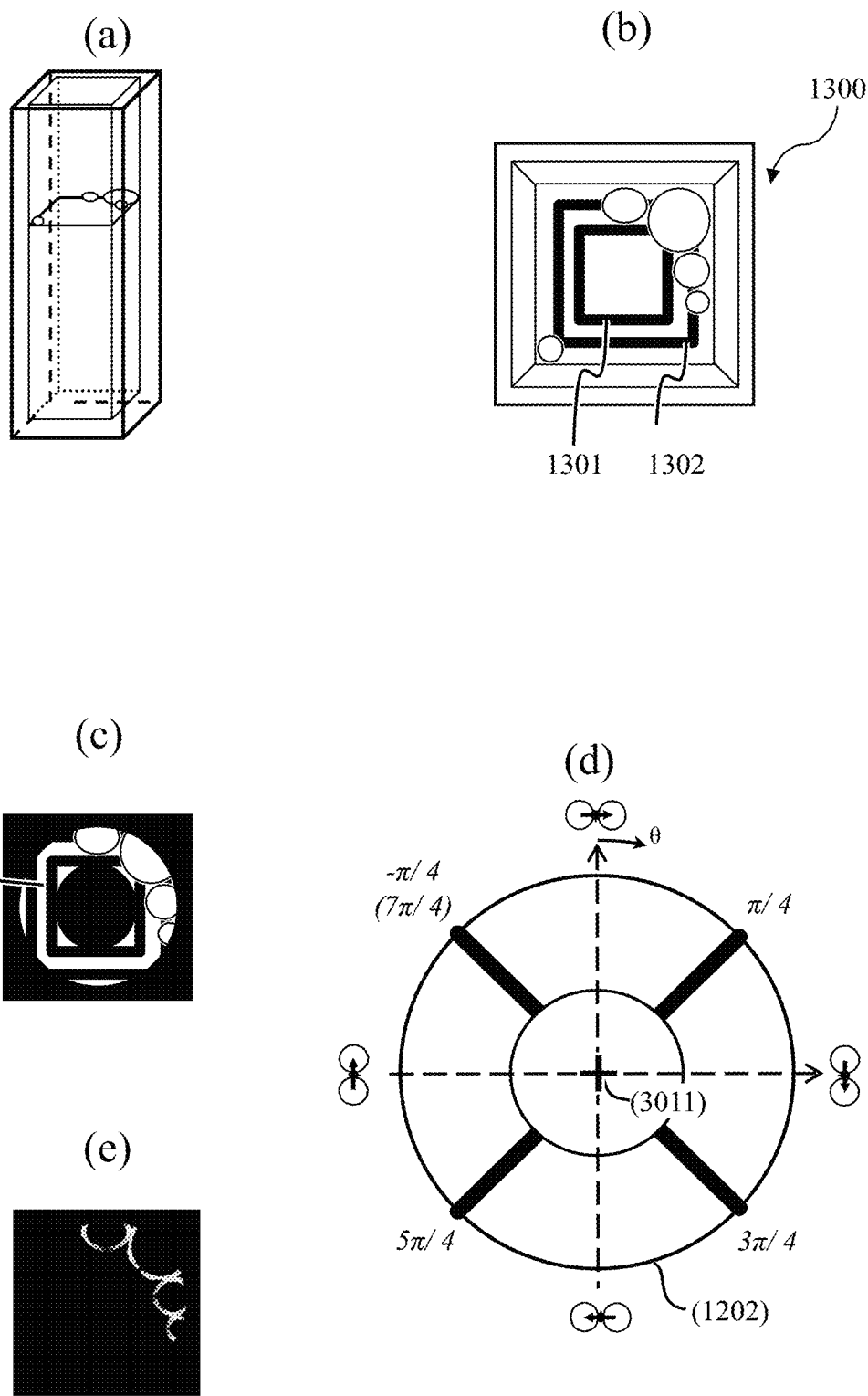
FIG. 13 is a diagram illustrating image information processing according to another embodiment of the present invention.

In embodiment 1, the method of obtaining the brightness gradient in the tangential direction of the circle has been described on the assumption that the test tube accommodating the liquid is a container of a cylindrical or conical configuration. In the present embodiment, a case where the container is of a configuration other than a cylindrical or conical configuration will be described with reference to FIG. 13.

FIG. 13(a) shows an example of a prism-shaped container, which contains a liquid substance such as a sample like blood or urine or a mixture liquid of a sample and reagent. FIG. 13(b) shows a picture 1300 taken by imaging such a prism-shaped container from above. Inside the container, due to the light and darkness of the reflection light from the bottom apart from the bubble, dark portions 1301 and 1302 of a double regular square configuration due to the configuration of the container are reflected. Regarding this image, the processing of the effective zone setting step of the brightness gradient detection method (step S212 of FIG. 2) and the brightness gradient calculation step (step S213) will be described.

FIG. 13(c) shows an effective zone 1303 set in step S212. In the drawing, the effective zone 1303 is a zone other than that painted black, and the effective zone is set to be a donut-shaped circle around the descent position for the dispense probe.

FIG. 13(d) is a diagram illustrating how, in step S213, the effective zone is divided into four portions by an angle π/2 in order to calculate the brightness gradient in the direction along a regular square, which is the configuration of the inner wall surface of the container. In each region after the division, the brightness gradient is calculated by using two of the above-mentioned weighting matrixes. More specifically, in the region of $-\pi/4+\varepsilon \leq \theta \leq \pi/4-\varepsilon$, the weighting matrix of FIG. 17 is used. In the region of $\pi/4+\varepsilon \leq \theta \leq 3\pi/4-\varepsilon$, the weighting matrix of FIG. 9(e) is used. In the region of $3\pi/4+\varepsilon \leq \theta \leq 5\pi/4-\varepsilon$, the weighting matrix of FIG. 9(a) is used. In the region of $5\pi/4+\varepsilon \leftarrow \theta \leq 7\pi/4-\varepsilon$, the weighting matrix of FIG. 9(e) is used. Here, ε is a value in which an error in the descent position (3011), etc. is taken into account and which is adjusted as appropriate.

FIG. 13(e) is a diagram illustrating the cultivated brightness gradient. Even if there are in the effective zone the dark portions 1301 and 1302 attributable to the configuration of the container and indicating the reflection light from the tube bottom, it is possible to accurately capture the outer configuration of a bubble, thus making it possible to perform the detection of the presence of a bubble. In the case of the region of $\pi/4+\varepsilon \leq \theta \leq 3\pi/4-\varepsilon$, and in the case of the region of $5\pi/4+\varepsilon \leq \theta \leq 7\pi/4-\varepsilon$, image information obtained through rotation by π/2 (90°) is adopted, whereby it is possible to perform calculation of the brightness gradient on all the regions solely by the weighting matrix of FIG. 9(a).

As described above, by calculating the brightness gradient in the direction along the test tube configuration, the detection of the liquid surface condition is possible by minimum processing.

[Example of the Application to an Automatic Analyzer]

Next, an automatic analyzer to which the present invention is applied will be described.

Figure 14:
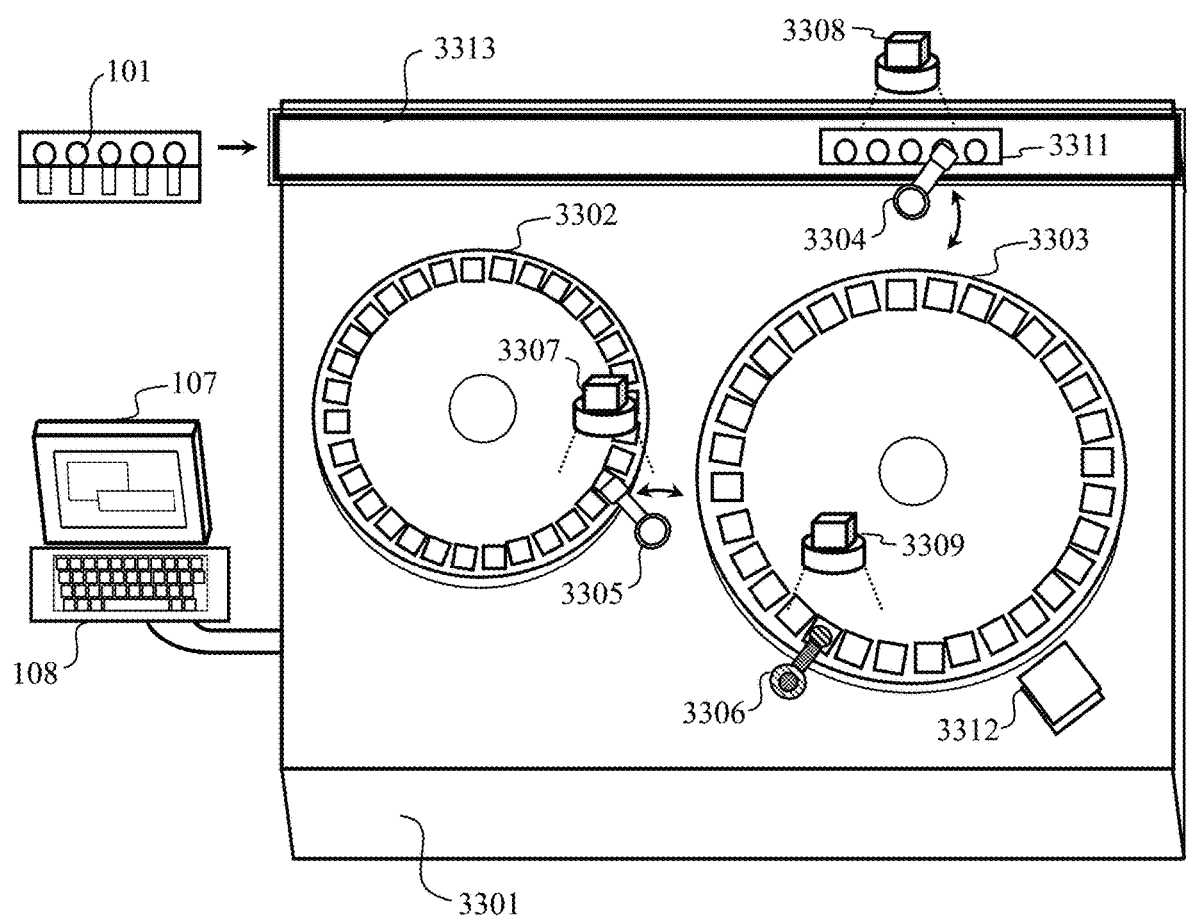
FIG. 14 is an overall view of an automatic analyzer to which the present invention is applied.

FIG. 14 is a schematic diagram illustrating an automatic analyzer according to an embodiment of the present invention. In particular, the automatic analyzer used here is an automatic analyzer automatically performing qualitative and quantitative analysis on a sample from a living body such as blood or urine; the apparatus described here is one analyzing items such as a biochemistry item, an immunity item, and a coagulation item. The analyzer to which the present invention is applied may be some other type of analyzer so long as it is endowed with a function by which it dispenses a sample or reagent by a dispense probe from a test tube to a reaction container or from a reagent container to a reaction container.

In the automatic analyzer 3301, there are arranged a reagent disk 3302, a reaction disk 3303, a sample dispense probe 3304, a reagent dispense probe 3305, a stirring device 3306, a photometer 3312, and a conveyance mechanism 3313. Further, connected to the automatic analyzer 3301 is a control device equipped with a display device 107 and an input device 108.

The reagent disk 3302 is rotatable and allows arrangement of a plurality of reagent containers in the circumference. Similarly, the reaction disk 3303 can be equipped with a plurality of reaction containers in the circumference. The conveyance mechanism 3313 can convey a sample holder 3311 accommodating a plurality of sample containers 101. In the present embodiment, there is employed a rack type sample holder 3311 capable of holding five sample containers 101, and it is possible to convey the sample containers 101 to a predetermined position by a conveyance belt horizontally driving with the sample holder being placed thereon.

The sample dispense probe 3304 is capable of rotational driving and vertical driving, and sucks the sample held by the sample holder 3311 carried to the predetermined position, dispensing and discharging the sample into a reaction container on the reaction disk 3303. The reagent dispense probe 3305 is also capable of rotational driving and vertical driving, and sucks reagent from the reagent container held on the reagent disk 3302, dispensing it to the reaction container on the reaction disk 3303. The stirring device 3306 stirs a mixture liquid in the reaction container. The photometer 3312 analyzes the mixture liquid after the stirring.

In the automatic analyzer according to the present invention, due to a liquid surface condition detector for sample 3308 provided above the conveyance mechanism 3311, and a liquid surface condition detector for reagent 3307 provided above the reagent disk, it is possible to detect the presence of a bubble on the liquid surface before performing the dispensing of the sample and reagent. Further, the presence of a bubble may be detected at the position where the dispensing is performed.

Further, there is provided above the reaction disk 3303 a liquid surface condition detector for reaction liquid 3309, whereby it is possible to image the liquid surface of the reaction liquid obtained by mixing the sample and reagent with each other, and to detect any abnormality on the liquid surface after the dispensing and stirring.

REFERENCE SIGNS LIST

101 Test tube
1010 Liquid substance
102 Lighting
1021 Hollow
103 Camera
1031 Lens
104 Image processing apparatus
105 Memory
106 Interface unit
107 Display unit
108 Input unit
3301 Automatic analyzer
3302 Reagent disk
3303 Reaction disk
3304 Sample dispense probe
3305 Reagent dispense probe
3306 Stirring device
3307 Liquid surface condition detector for sample
3308 Liquid surface condition detector for reagent
3309 Liquid surface condition detector for reaction liquid
3311 Sample holder

The invention claimed is:

1. A liquid surface condition detector, comprising:
   an irradiation unit for irradiating, with light, a container storing a liquid substance and a liquid surface of the liquid substance from above;
   an imaging unit for capturing, from above, an image of the liquid substance subjected to light irradiation by the irradiation unit;
   a processor connected to the imagine unit that is programmed to:
   detect a first condition of the liquid surface of the liquid substance using color information contained in the image,
   calculate a brightness gradient in the captured image based on a pixel brightness along a tangential direction of a circle that is coaxial with an inner wall surface of the container, and
   determine a second condition of the liquid surface of the liquid substance based on the calculated brightness gradient.

2. The liquid surface condition detector according to claim 1, wherein the processor is further programmed to determine whether to detect the first condition of the liquid surface of the liquid substance using color information contained in the image or determine the second condition of the liquid surface of the liquid substance based on the calculated brightness gradient, based on the color information contained in the image.

3. The liquid surface condition detector according to claim 1, wherein the processor is further programmed to detect the first condition based on a number of regions having the color information corresponding to the color of the light irradiated from the irradiation unit, and
   wherein the first condition is presence or absence of bubbles on the surface of the liquid.

4. The liquid surface condition detector according to claim 1, wherein the liquid substance is any of a biospecimen, a reagent used in analyses for the biospecimen, a mixture of the biospecimen and the reagent, and a reaction liquid of the biospecimen and the reagent.

5. The liquid surface condition detector according to claim 1, further comprising a probe for sucking the liquid substance, wherein an optical axis of the imaging unit is disposed so as to substantially coincide with a position where the probe descends.

6. An automatic analyzer comprising:
   a sample container transfer mechanism for transferring a sample container containing samples;
   a reagent container transfer mechanism for transferring a reagent container containing reagents to be mixed with the samples;
   a reaction container transfer mechanism for transferring a reaction container containing reaction liquids resulting from mixture of the samples and the reagents;

an imaging mechanism for capturing images of the liquids contained in at least any of the sample container, the reagent container, and the reaction container; and a controller connected to the imaging mechanism that is programmed to:

detect a first condition of a liquid surface using color information contained in the image, calculate a brightness gradient in the captured image based on a pixel brightness along a tangential direction of a circle that is coaxial with an inner wall surface configuration of the container, and determine a second condition of the liquid surface of the liquid substance based on the calculated brightness gradient.

7. The automatic analyzer according to claim 6, further comprising a probe mechanism for sucking a predetermined amount of liquid from the sample container or the reagent container that the sample container transfer mechanism or the reagent container transfer mechanism has located at a position for dispensing, wherein the imaging mechanism captures images of the liquids inside the sample container or the reagent container before or after the sample container or the reagent container is located at the position for dispensing.

\* \* \* \* \*